US011221553B2

(12) United States Patent
Wang et al.

(10) Patent No.: US 11,221,553 B2
(45) Date of Patent: Jan. 11, 2022

(54) TOTAL INTERNAL REFLECTION SCREEN AND PROJECTION SYSTEM

(71) Applicant: APPOTRONICS CORPORATION LIMITED, Guangdong (CN)

(72) Inventors: Lin Wang, Shenzhen (CN); Fei Hu, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 16/636,484

(22) PCT Filed: Dec. 6, 2017

(86) PCT No.: PCT/CN2017/114727
§ 371 (c)(1),
(2) Date: Jun. 22, 2020

(87) PCT Pub. No.: WO2019/024368
PCT Pub. Date: Feb. 7, 2019

(65) Prior Publication Data
US 2020/0387061 A1 Dec. 10, 2020

(51) Int. Cl.
*G03B 21/602* (2014.01)
*G02B 5/02* (2006.01)
(Continued)

(52) U.S. Cl.
CPC ......... *G03B 21/602* (2013.01); *G02B 5/0284* (2013.01); *G03B 21/56* (2013.01);
(Continued)

(58) Field of Classification Search
CPC ...... G03B 21/602; G03B 21/60; G03B 21/56; G03B 21/625; G03B 21/604; G02B 5/0284
(Continued)

(56) References Cited

U.S. PATENT DOCUMENTS

| 6,707,605 B2* | 3/2004 | Sekiguchi | G03B 21/625 359/443 |
| 2004/0160669 A1* | 8/2004 | Osawa | G03B 21/625 359/460 |

(Continued)

FOREIGN PATENT DOCUMENTS

| CN | 1670618 | 9/2005 |
| CN | 1693989 | 11/2005 |

(Continued)

OTHER PUBLICATIONS

International Search Report for International Application PCT/CN2017/114727, dated Apr. 28, 2018.

*Primary Examiner* — Clayton E. LaBalle
*Assistant Examiner* — Kevin C Butler
(74) *Attorney, Agent, or Firm* — Burris Law, PLLC

(57) ABSTRACT

A total internal reflection screen includes a light diffusion layer, a total internal reflection layer and a light absorption layer arranged sequentially from an incidence side of a projected light. The light absorption layer absorbs an incident light and the light diffusion layer increases a divergence angle of an emergent light. The total internal reflection layer includes a plurality of microstructure units that is rotationally symmetrical and extends continuously in a plane of the total internal reflection screen. Each of the microstructure units includes a first material layer disposed at the side of the light diffusion layer and a second material layer disposed at the side of the light absorption layer. The interface between the first material layer and the second material layer is includes two intersecting planes, which are disposed in such a way that the projected light is totally internally reflected continuously at the two intersecting planes.

18 Claims, 11 Drawing Sheets

(51) Int. Cl.
    *G03B 21/56*       (2006.01)
    *G03B 21/625*     (2014.01)
    *G03B 21/604*     (2014.01)
    *G03B 21/60*       (2014.01)

(52) U.S. Cl.
    CPC .......... *G03B 21/60* (2013.01); *G03B 21/604* (2013.01); *G03B 21/625* (2013.01)

(58) Field of Classification Search
    USPC ........................................................ 359/459
    See application file for complete search history.

(56) References Cited

U.S. PATENT DOCUMENTS

| | | | | |
|---|---|---|---|---|
| 2005/0248843 | A1* | 11/2005 | Maruta | G03B 21/602 |
| | | | | 359/459 |
| 2008/0062525 | A1* | 3/2008 | Cheng | G02B 5/0278 |
| | | | | 359/599 |
| 2020/0387061 | A1* | 12/2020 | Wang | G03B 21/602 |

FOREIGN PATENT DOCUMENTS

| | | | | |
|---|---|---|---|---|
| CN | 1954260 | | 4/2007 | |
| CN | 101128755 | A | 2/2008 | |
| CN | 101809498 | * | 8/2010 | ............... G02B 5/02 |
| CN | 101809498 | A | 8/2010 | |
| CN | 105408777 | * | 3/2016 | ............... G02B 5/02 |

* cited by examiner (a) Distribution Of Test Points On Screen (b) Contrast Under Same Illuminance

TOTAL INTERNAL REFLECTION SCREEN AND PROJECTION SYSTEM

CROSS-REFERENCE TO RELATED APPLICATIONS

This application is a National Phase of International Application No. PCT/CN2017/114727, filed on Dec. 6, 2017, which claims priority to and the benefit of CN 2017106621964, filed on Aug. 4, 2017. The disclosures of the above applications are incorporated herein by reference.

FIELD

The present disclosure relates to a projection screen and a projection system. Specifically, the present disclosure relates to a high-contrast total internal reflection screen capable of resisting ambient light and a projection system using the screen.

BACKGROUND

The statements in this section merely provide background information related to the present disclosure and may not constitute prior art.

In recent years, with continuous improvement of brightness of a projector, advantages of a projection display system in large-size home theater applications have begun to manifest. Compared with LCD TVs and OLED TVs, the projection display system has a small size, is easy to install and can easily achieve a display screen larger than 100 inches, and the price of the entire system is relatively low.

In a home application environment, the projection display system is often installed in a living room. The living room usually has good natural lighting conditions and bright lighting sources, so there is a lot of ambient stray light. Generally, a projector screen can reflect both light of the projector and the ambient light. In such an environment, due to an influence of the ambient light, contrast of an image formed by the light reflected by the projection screen is much lower than contrast of the projector itself. To improve screen contrast under presence of the ambient light, at present, projection screens resistant to the ambient light are implemented by an array microstructure together with a light reflecting layer or a light absorbing layer.

However, since a dimension of the microstructure is very small, and a pitch is generally in a range of 25 to 250 microns, so that a process of selectively coating the optical functional layer on the surface of the microstructure is very complicated, the yield is low, and the optical efficiency is not high.

SUMMARY

This section provides a general summary of the disclosure and is not a comprehensive disclosure of its full scope or all of its features.

The present disclosure provides a total internal reflection screen and a projection system which improves a screen gain while achieving high contrast and simplifies processing technology and reduce cost.

According to one form of the present disclosure, a total internal reflection screen is provided. The total internal reflection screen includes a light diffusing layer, a total internal reflection layer, and a light absorbing layer that are arranged sequentially from an incident side for the projection light. The light absorbing layer is capable of absorbing incident light, and the light diffusing layer is configured to increase a divergence angle of emergent light.

The total internal reflection layer includes at least a microstructure layer located on the light diffusing layer side and an inner layer located on the light absorbing layer side. A refractive index of the microstructure layer is larger than that of the inner layer. The microstructure layer is provided with a plurality of microstructure units, which extend continuously in a plane of the total internal reflection screen and are rotationally symmetrical.

Two intersecting planes included in each of the microstructure units are configured in such a way that the projection light is totally internally reflected at both of the two intersecting planes successively.

Another form according to the present disclosure provides a projection system, and the system includes the total internal reflection screen as described above and a projector.

As described above, the total internal reflection screen and the projection system according to the present disclosure have at least following advantages:

(1) The microstructure uses the total internal reflection principle to reflect the projection light, the light absorbing layer for absorbing ambient stray light is integrally provided on a back side of the microstructure, and there is no need to coat a metal reflective film or a light absorbing layer in the microstructure, which reduces the cost and improves the yield.

(2) The microstructure uses angle selection characteristics of total internal reflection to reflect at least part of the light from the projector, and at the same time, it does not reflect the ambient stray light towards a viewing area of a viewer substantially. Most of the ambient stray light from the top penetrates through the total internal reflection microstructure and is absorbed by the light absorbing layer on the back side, and a small portion is reflected outside the viewing area of the viewer, thereby increasing the contrast of the projected image while increasing an optical efficiency.

It should be understood that the beneficial effects of the present disclosure are not limited to the above-mentioned effects but may be any beneficial effects described herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
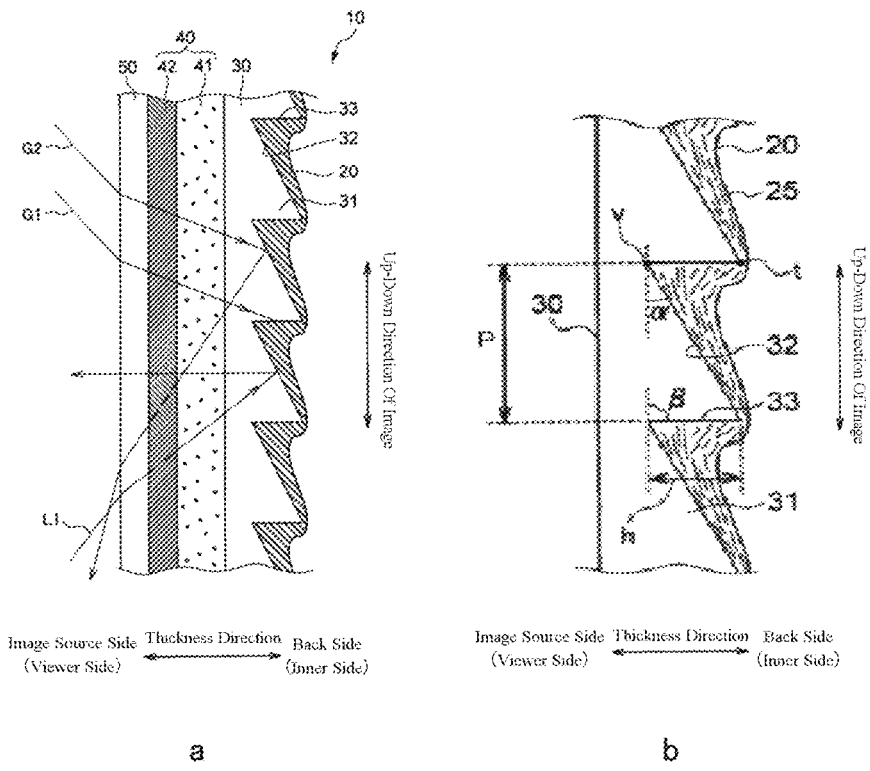
FIG. 1 is a schematic diagram of an example of a projection screen in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, specific forms or variations according to the present disclosure will be described in detail with reference to the accompanying drawings. It should be emphasized that all dimensions in the drawings are only schematic and are not necessarily illustrated in actual scale, and thus are not restrictive. For example, it should be understood that thicknesses and thickness ratios of respective layers in a multilayer structure of a light condenser shown in the drawing are not shown according to actual dimensions and ratios and are only for convenience of illustration.

As described in the background, since a projector screen can reflect both the light of the projector and the ambient light, when it is applied in the home application environment with a lot of ambient stray light, contrast of an image formed by the light reflected by the projection screen will be greatly reduced due to the influence of the ambient light. In order to achieve the purpose of improving the contrast, at present, an optical functional layer for absorbing light and/or reflecting light is provided in microstructures of the screen.

For example, as shown in FIGS. 1*a* and 1*b*, a circular-symmetrical Fresnel optical screen structure is proposed in a Chinese Patent Application No. CN105408777A. This screen uses a technical scheme of an array microstructure together with a light absorbing layer. The array microstructure of the screen is composed of a lens face 32 and a non-lens face 33. An angle between the lens face 32 and the plane of the screen is smaller than an angle between the non-lens face 33 and the plane of the screen, and incident light from the projector is only incident to the lens face 32 with a small angle. The light incident on the lens face 32 is reflected to a viewer side by a reflecting layer 20 formed by a plurality of metal films 25 laminated on a surface thereof. Although the screen can reflect the incident light from the projector to the viewer's eyes, the specular reflecting layer 20 inevitably reflects light incident from other directions, such as ambient stray light, so that the contrast of the projection screen cannot be greatly improved. In order to improve the contrast, one coloring layer 42 needs to be added on the viewer side of the array microstructure. The coloring layer 42 absorbs the stray light but also absorbs part of the projection light. Therefore, although the contrast of the screen is improved, an optical efficiency of the entire projection system is reduced, which means that a compromise is made between the contrast and the optical efficiency. The screen gain of projection screens which currently are mass-produced and available in the market can be only about 0.9 to 1.1.

Figure 2:
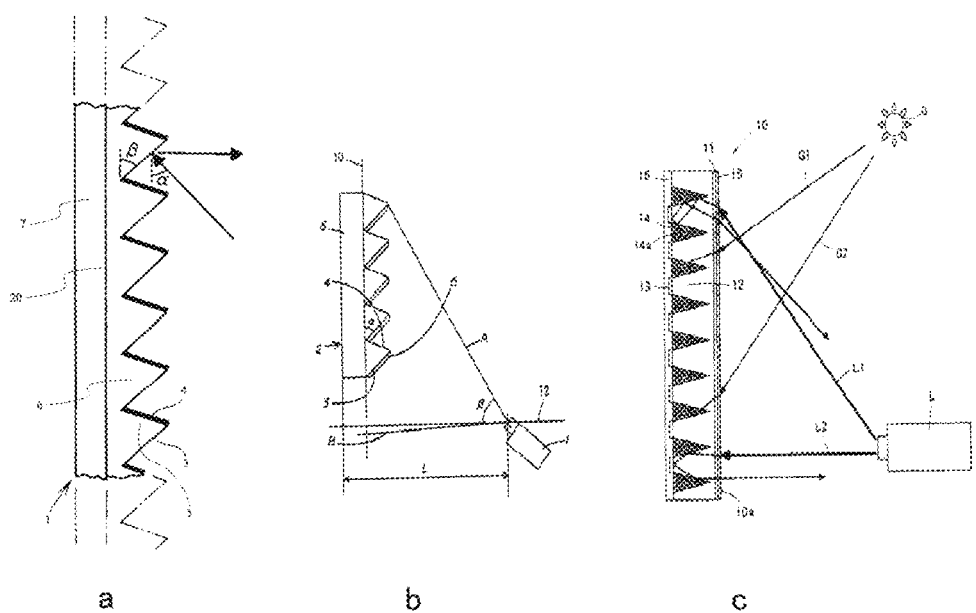
FIG. 2 is a schematic diagram of other examples of a projection screen in the related art.

A reflection-type screen is disclosed in a Chinese Patent Application No. CN1670618A, which has a microstructure as shown in FIG. 2*a*. The microstructure unit consists of two inclined surfaces, of which an inclined surface 3 formed by white reflective resin is facing towards the projector and used to reflect the light from the projector, and an upward inclined surface is coated with a black light absorbing layer 4 and used for absorbing ambient light incident from above the screen. A screen disclosed in a Chinese Patent Application No. CN1693989A has a similar structure. As shown in FIG. 2*b*, a substrate material constituting a microstructure is a material capable of absorbing light, and a downward inclined surface is coated with a white resin layer 6 to reflect light from the projector. In addition, a Chinese Patent Application No. CN1954260A also proposes a reflection-type screen. As shown in FIG. 2*c*, a light absorbing portion 14 and a reflecting layer 13 form a microstructure having an isosceles trapezoidal cross-section, wherein ambient light is absorbed by the light absorbing portion 14, and the projection light is totally internally reflected on a surface of the light absorbing portion 14 and reflected by the reflecting layer 13 at a bottom surface of a narrow side of the trapezoid.

Although the above projection screens implemented by an array microstructure together with a light reflecting layer or a light absorbing layer can improve the contrast, since a dimension of the microstructure is very small, and a pitch is generally in a range of 25 to 250 microns, so that a process of selectively coating the optical functional layer on the surface of the microstructure is very complicated, the yield is low, and the optical efficiency is not high.

In view of the above problems, the present disclosure provides a total internal reflection screen, which can improve a screen gain while achieving high contrast and can simplify processing technology and reduce cost. The total internal reflection screen of the present disclosure could be described from the following four aspects:

I. Overview of Total Internal Reflection Projection System

Figure 3:
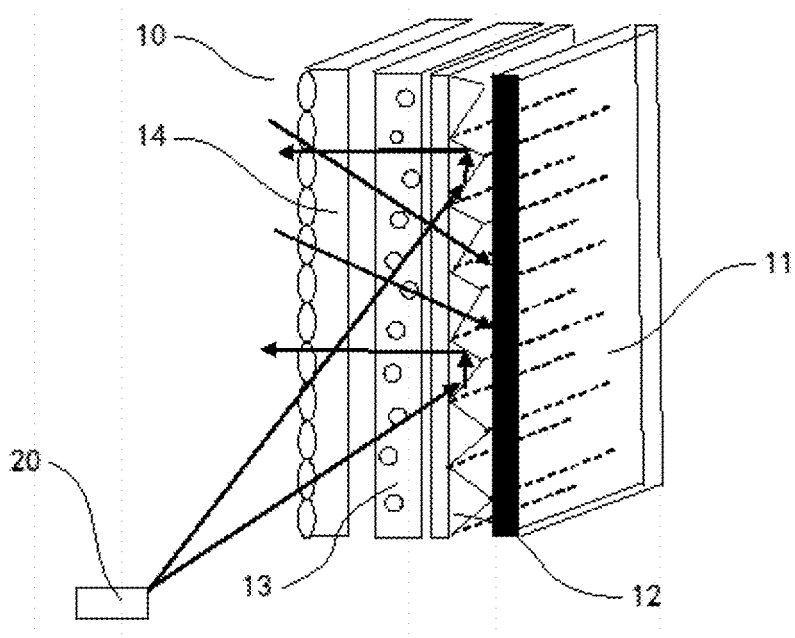
FIG. 3 is a structural schematic diagram of a projection system according to the teachings of the present disclosure.

FIG. 3 is a structural schematic diagram of a projection system according to one form of the present disclosure. As shown in FIG. 3, the projection system 1 includes a total internal reflection screen 10 and a projector 20. The total internal reflection screen 10 includes a surface microstructure layer 14, a volume diffusing layer 13, a total internal reflection layer 12, and a light absorbing layer 11 which are sequentially stacked from an incident side for projection light of the projector. The projection light from the projector 20 penetrates through the surface microstructure layer 14 and the volume diffusing layer 13 to be incident into the total internal reflection layer 12. Hereinafter, the incident side for the projection light of the total internal reflection screen 10 is also referred to as an outer side of the screen (i.e., a side facing towards a viewer), and the light absorbing layer side is referred to as an inner side of the screen (i.e., a side facing away from the viewer). The total internal reflection layer 12 is formed with an array of microstructure units. Each of the microstructure units contains two inclined planes. Inclination angles of these two inclined planes are precisely designed, so that the projection light incident from a lower side of the screen 10 is totally internally reflected on both of the two inclined surfaces and finally reflected into a field of view of the viewer, while ambient stray light from an upper side of the screen 10 cannot satisfy a condition to be totally internally reflected on both of the two inclined surfaces, so it penetrates through the total internal reflection layer 12 and is absorbed by the light absorbing layer 11. The light absorbing layer 11 is black, for example.

Figure 4:
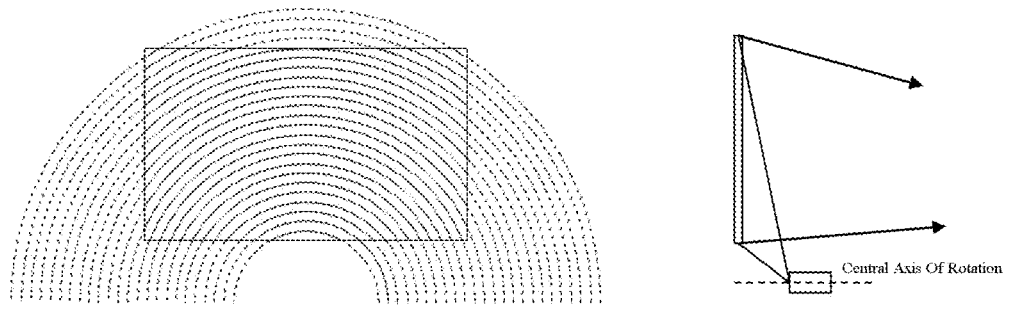
FIG. 4 is a schematic diagram of a rotationally symmetrical structure of a total internal reflection layer of a total internal reflection screen according to the teachings of the present disclosure.

As shown in FIG. 4, the microstructure unit of the total internal reflection layer 12 has a rotationally symmetrical array arrangement structure on a plane of the screen. A rotation central (optical center) axis of the rotationally symmetrical array arrangement structure is perpendicular to the plane of the screen and located below the screen. In this form, the projector 20 is arranged on the rotation central axis.

The volume diffusing layer 13 and the surface microstructure layer 14 are provided in this order on the outer side of the total internal reflection layer 12. The volume diffusing layer 13 and the surface microstructure layer 14 may be collectively referred to as a light diffusing layer, and both of them are used to diffuse a collimated light beam reflected from the total internal reflection layer 12, so that the total internal reflection screen 10 has a larger viewing angle. It should be understood that although an example in which the volume diffusing layer 13 and the surface microstructure layer 14 are provided at the same time is illustrated in FIG. 3, the total internal reflection screen 10 may be provided with only the volume diffusing layer 13 or only the surface microstructure layer 14. In addition, at the outer side of the surface microstructure layer 14, a protective layer may be additionally provided to inhibit scratches or chemical corrosion. Certainly, other auxiliary functional layers can also be provided according to design requirements.

Figure 5:
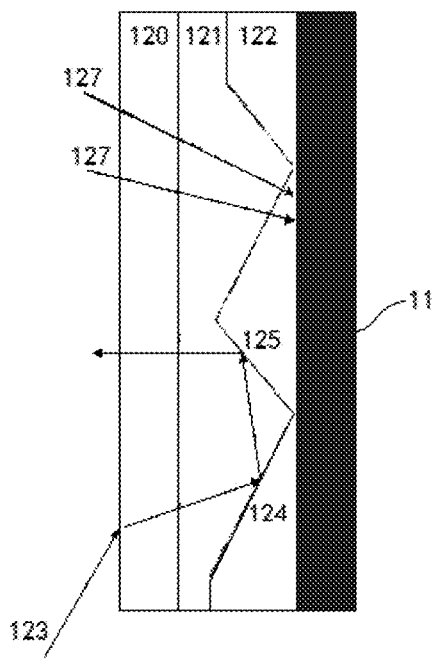
FIG. 5 is a cross-sectional structural schematic diagram of microstructure units of a total internal reflection layer of a total internal reflection screen according to the teachings of the present disclosure.

FIG. 5 shows a cross-sectional structural schematic diagram of the microstructure units of the total internal reflection layer 12 of the total internal reflection screen according to one form of the present disclosure. As shown in FIG. 5, the total internal reflection layer 12 includes a transparent substrate 120, a microstructure layer 121, and an inner layer 122. The transparent substrate 120 is located on a side of the total internal reflection layer 12 closest to the light diffusing layer and it is in contact with the light diffusing layer. The transparent substrate 120 includes transparent materials such as PET, PC, or PMMA. The microstructure layer 121 is disposed on an opposite side of a side of the transparent substrate 120 in contact with the light diffusing layer. The microstructure layer 121 is made of resin material, which is usually epoxy resin, acrylate, polyester, polyurethane or polyimide and so on. The transparent substrate 120 and the microstructure layer 121 are formed into one piece by a UV coating device or a thermoforming device. The inner layer 122 is formed on a side of the microstructure layer 121 close to the light absorbing layer and it is in contact with the light absorbing layer 11. A refractive index of a material forming the inner layer 122 is lower than that of the material forming the microstructure layer 121. A plurality of microstructure units are disposed on a surface of the microstructure layer 121 adjacent to the inner layer 122. In each of the microstructure units of the total internal reflection layer 12, the microstructure layer 121 is formed as a total internal reflection prism and has two inclined intersecting surfaces 124 and 125. In other words, in each of the microstructure units of the total internal reflection layer 12, the microstructure layer 121 is formed of a row of rotationally symmetrical prisms located on the surface of the transparent substrate 120, and the intersecting surfaces 124 and 125 are interfaces between two different material layers, the microstructure layer 121 and the inner layer 122, in which the microstructure layer 121 is a first material layer, and the inner layer 122 is a second material layer. For example, such prisms are formed by using the coating resin and UV curing or thermal curing processes. For clarity, only two microstructure units are shown in FIG. 5. The incident light 123 from the projector below the screen is totally internally reflected once at the two inclined surfaces 124 and 125 respectively and finally reflected into a direction of the viewer's eyes. The ambient stray light 127 mainly comes from a ceiling light in a room. In most cases, the ceiling light is far from the rotation axis of the rotationally symmetrical structure of the microstructure units of the screen, and an incident angle of the ambient stray light 127 is much smaller than that of the projection light. Therefore, the ambient stray light 127 cannot satisfy the condition to be totally internally reflected at the surface 124 and the surface 125, and most of the ambient stray light 127 penetrates through the microstructure unit and is absorbed by the light absorbing layer 11. Since the light absorbing layer 11 is integrally disposed at the inner side of the total internal reflection layer 12, a manufacturing process is simplified and does not cause loss of the projection light.

As described above, the total internal reflection screen 10 according to the forms and variations of the present disclosure utilizes characteristic of angle selective reflection of the total internal reflection layer 12, so that the screen can automatically distinguish the projection light from the ambient light, and the light absorbing layer 11 used for absorbing the ambient stray light is integrally disposed inside the total internal reflection layer 12, thereby achieving optical characteristics of high contrast and high gain while simplifying the processing technology, reducing cost, and improving a yield.

Figure 6:
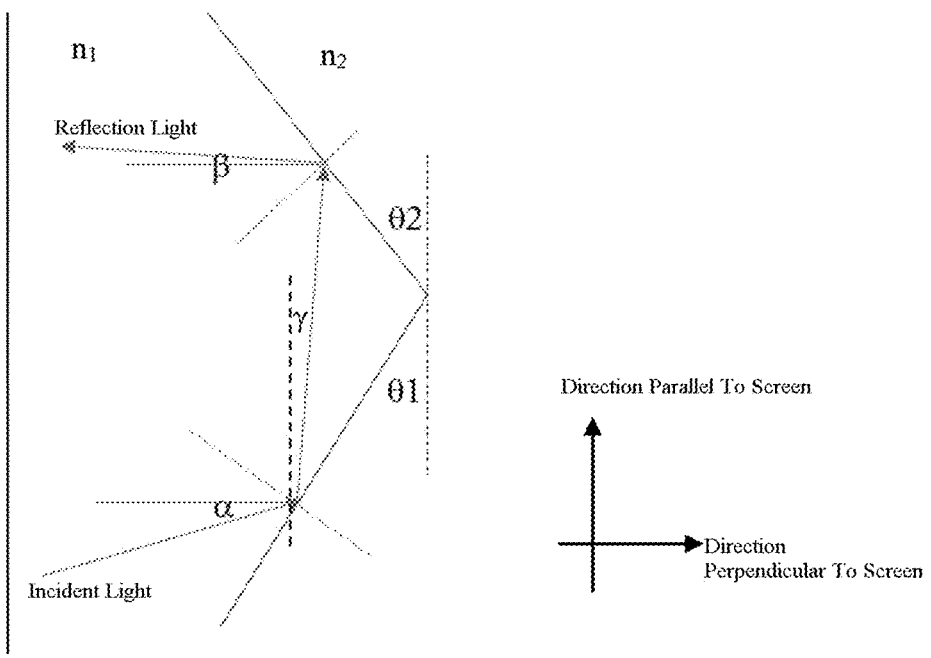
FIG. 6 is a schematic diagram showing an optical principle of a microstructure of a total internal reflection layer of a total internal reflection screen according to the teachings of the present disclosure.

II. Optical Principle and Angle Selection of Total Internal Reflection Microstructure Unit FIG. 6 illustrates an optical principle of the total internal reflection microstructure unit of the total internal reflection screen according to another form of the present disclosure. As shown in FIG. 6, the refractive index of the microstructure layer 121 is $n_1$, the refractive index of the inner layer 122 is $n_2$, and angles between each of the two inclined surfaces of the microstructure unit and the plane of the screen (that is, a vertical direction) are $\theta_1$ and $\theta_2$ (the unit is degree, the same applies hereinafter), respectively. Angles between the incident light, the reflected light and the vertical direction are $\alpha$ and $\beta$ (the unit is degree, the same applies hereinafter) respectively. When the reflected light is emitted horizontally, $\beta$ is obviously 0 degree, and it is set that $\beta$ is a negative value when the reflected light is below a horizontal line (that is, biased towards the ground) and $\beta$ is a positive value when the reflected light is above the horizontal line (that is, biased towards the ceiling). In order for the incident light from the projector 20 to be totally internally reflected by the two inclined planes twice and then emitted towards the direction of the viewer's eyes, according to geometrical optical principles and optical total internal reflection conditions, following formulas (1)-(3) must be satisfied:

$$\theta_1 + \theta_2 = \frac{180 - (\alpha + \beta)}{2} \quad (1)$$

$$\cos(\theta_1 + \alpha) < \sqrt{1 - \left(\frac{n_2}{n_1}\right)^2} \quad (2)$$

$$\cos(\theta_2 + \beta) < \sqrt{1 - \left(\frac{n_2}{n_1}\right)^2} \quad (3)$$

Values of $\theta_1$ and $\theta_2$ cannot be completely determined based on the formulas (1)-(3), and a certain degree of design freedom is left. It is assumed that an angle between intermediate light, which is located between the incident light and the emitted light, and the plane of the screen (that is, the vertical direction) is $\gamma$, and it is set that is a positive value when the intermediate light is biased towards the viewer side, and is a negative value when the intermediate light is biased towards the viewer side. Then, according to the geometrical optical principles and the optical total internal reflection conditions, it can be calculated that:

$$\theta_1 = \frac{90 - \alpha - \gamma}{2} \quad (4)$$

$$\theta_2 = \frac{90 - \beta + \gamma}{2} \quad (5)$$

It can be known from the formulas (4) and (5) that as long as light paths of the incident light, the emitted light and the intermediate light are determined (that is, $\alpha$, $\beta$, and $\gamma$ are determined), the inclination angles $\theta_1$ and $\theta_2$ of the two intersecting planes of the microstructure can be completely determined.

In addition, it can also be known from the formulas (4) and (5) that even in a case where the light paths of the incident light and the emitted light are determined, the values of $\theta_1$ and $\theta_2$ can be selected within a certain range by adjusting the light path of the intermediate light (that is, adjusting the value of $\gamma$) according to different application needs. For example, in an application of ultra-short focus projection, the projector is located below the screen, so $\alpha > 0$ is always true; and the viewer's eyes are above the projector, in order to provide that the emitted light is incident to the viewer's eyes, $\alpha + \beta > 0$ is always true; in this case, it can be obtained from the formula (1) that:

$$\theta_1 + \theta_2 < 90 \quad (6)$$

It can be known from the formula (4) that in the application of the ultra-short focus projection, the angle between the two inclined surfaces 124 and 125 of the microstructure unit of the total internal reflection screen according to the present disclosure must be an obtuse angle.

Figure 7:
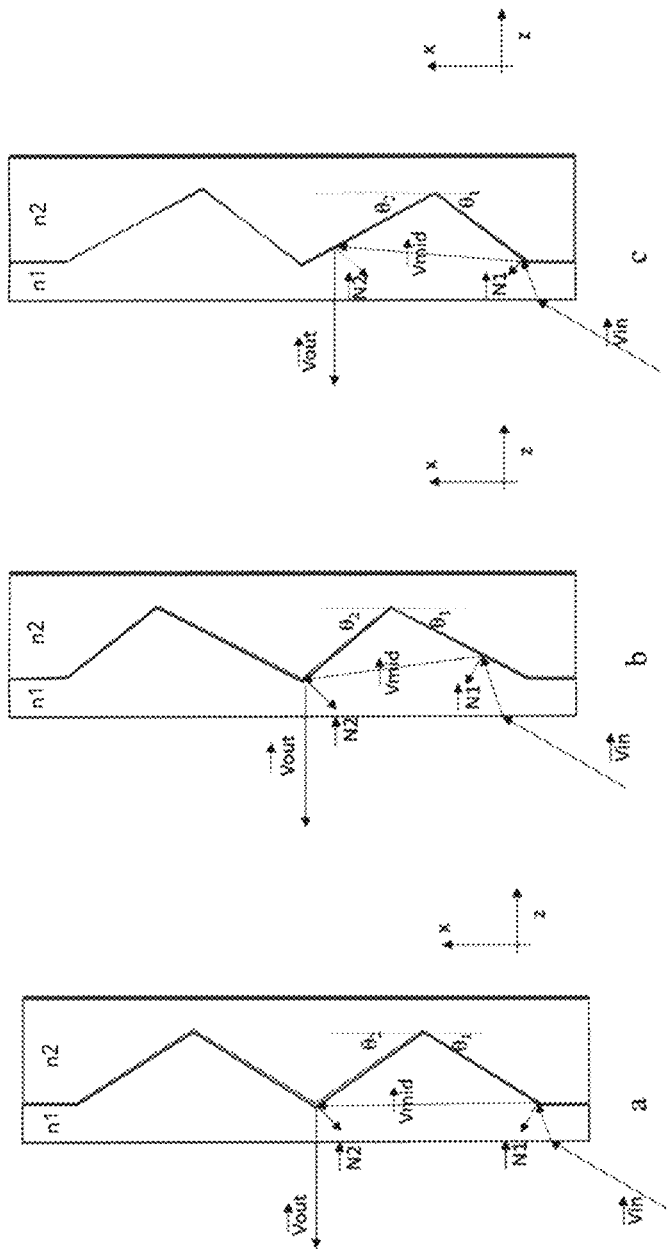
FIG. 7 is a schematic diagram showing selection of an optical inclination angle of a microstructure of a total internal reflection screen according to the teachings of the present disclosure.

FIG. 7a shows a case of an ideal light path, in which the intermediate light Vmid obtained after the incident projection light Vin is totally internally reflected by one inclined surface of the microstructure unit travels in the microstructure layer 121 in a direction parallel to the plane of the screen, and the Vmid is totally internally reflected by the other inclined surface of the microstructure unit and then becomes the emitted light Vout emitted horizontally towards the direction of the viewer.

In the case shown in FIG. 7a, at this time, $\gamma = 0$ degree, $\beta = 0$ degree, and when $\theta_2 = 45$ degrees, the emitted light is emitted perpendicular to the screen, that is, $\beta = 0$ degree, then according to the formula (6), it can be known that $\theta_1 < 45$ degrees, that is, $\theta_1 < \theta_2$.

However, in practical applications, there may also be cases of non-ideal light paths as shown in FIGS. 7c and 7b. In FIG. 7b, the intermediate light Vmid is generated after the incident light Vin is totally internally reflected by the first inclined surface of the microstructure unit, but the traveling direction of Vmid is biased towards the viewer instead of being parallel to the plane of the screen (at this time, $\gamma$ is a positive value). Therefore, part of Vmid may be not reflected by the second inclined plane but directly emitted without fully utilizing the second inclined plane of the microstructure unit. In FIG. 7c, the incident light Vin is totally internally reflected by the first inclined surface of the microstructure unit to generate the intermediate light Vmid, but the traveling direction of Vmid is biased towards the side facing away from the viewer instead of being parallel to the plane of the screen (at this time, $\gamma$ is a negative value). Therefore, the second inclined surface of the microstructure unit cannot be fully utilized.

Figure 8:
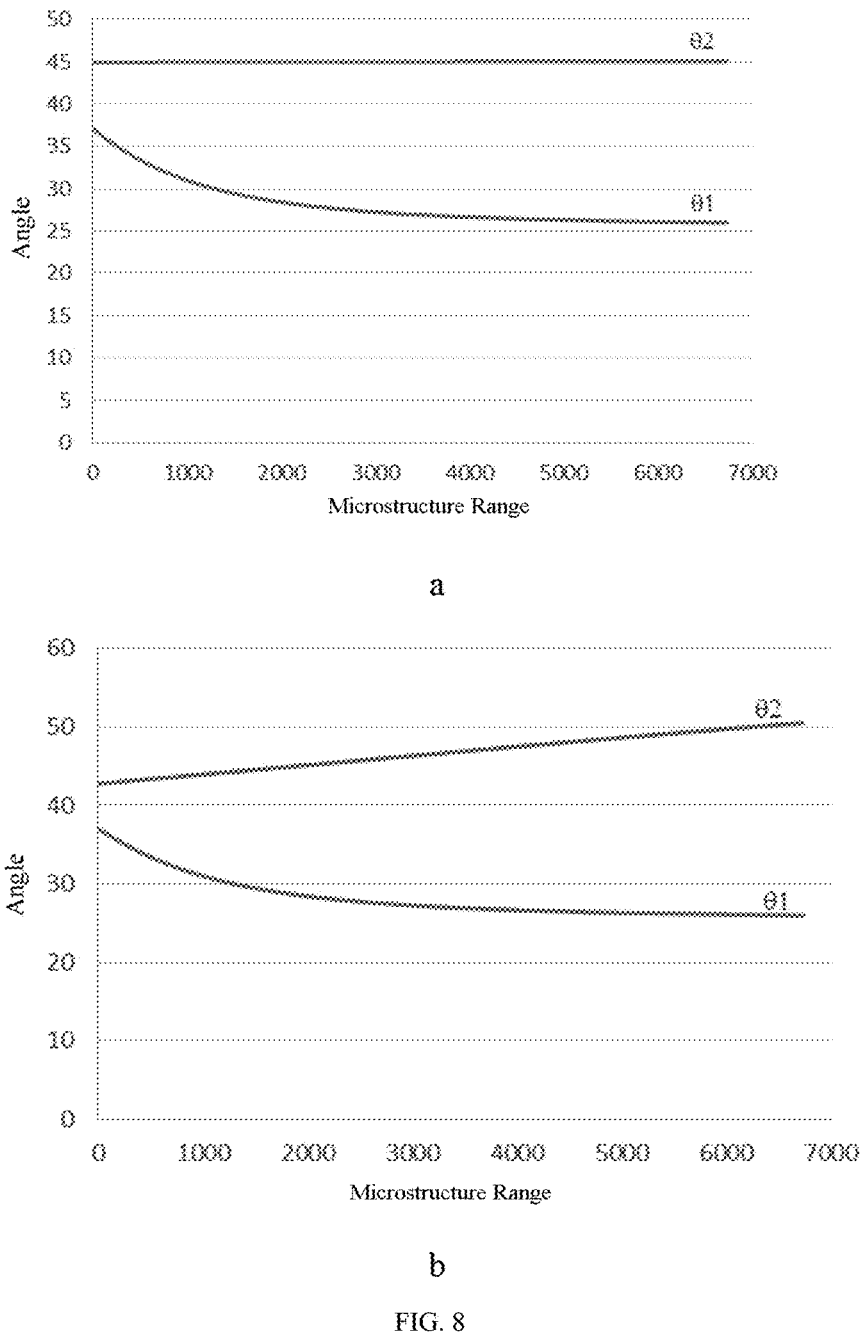
FIG. 8 is a simulation example of an optical angle of a microstructure unit of a total internal reflection screen according to the teachings of the present disclosure.

In addition, as described above, the total internal reflection screen 10 according to the present disclosure has a rotationally symmetrical structure and includes a plurality of microstructure units. Therefore, angle designs of the respective microstructure units can be the same or different. For example, FIG. 8 illustrates a simulation example of an optical angle of a microstructure unit of a total internal reflection screen according to the present disclosure. A focus of the total internal reflection screen shown in FIG. 8a is at infinity far, that is, in all the microstructure units of the total internal reflection screen, all the emitted light is emitted horizontally towards the direction of the viewer, so $\beta = 0$ degree and $\theta_2 = 45$ degrees are always true. According to the simulation result, it can be known that $\theta_1$ of the microstructure unit gradually decreases as it approaches the top of the screen, and $\theta_1 < \theta_2$, so the formula (4) is satisfied. In the total internal reflection screen shown in FIG. 8b, the focus of the total internal reflection screen is no longer located at infinity far. In this case, along the direction from a center of the screen to an edge of the screen, the value of $\theta_1$ of the microstructure unit of the total internal reflection screen continuously decreases and the value of $\theta_2$ continuously increases.

III. Refractive Index Selection of Total Internal Reflection Microstructure Unit.

Figure 9:
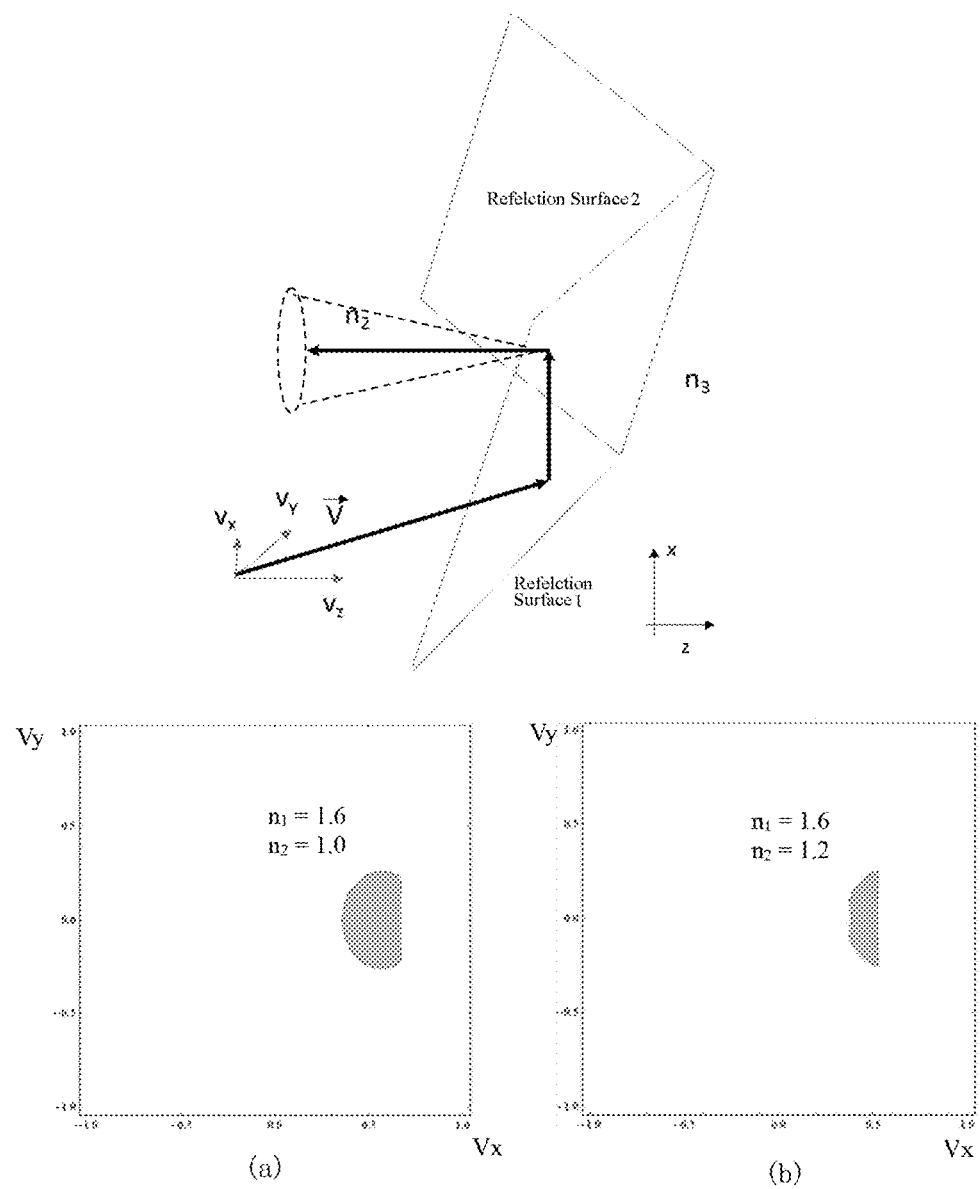
FIG. 9 is a schematic diagram showing selection ranges of material refractive indices of a total internal reflection layer and a light absorbing layer of a total internal reflection screen according to the teachings of the present disclosure.

In addition to the values of 01 and 02, it can be known from the optical total internal reflection formulas that the total internal reflection microstructure unit satisfying two total internal reflections is also affected by the refractive index $n_1$ of the microstructure layer 121 and the refractive index $n_2$ of the inner layer 122. The microstructure layer 121 of the total internal reflection screen according to the present disclosure is generally made of a transparent resin material, and its refractive index is in a range of 1.3 to 1.7. Alternatively, the microstructure layer 121 can also be made of other materials having a similar refractive index. In addition, a material used for making the microstructure layer 121 may be doped with scattering ions, absorbing materials, or the like. Therefore, in order to satisfy the condition of total internal reflection, the selection of the refractive index $n_2$ of the inner layer 122 needs to be considered. FIG. 9 shows the influence of different refractive indices $n_2$ of the inner layer 122 on a total internal reflection area of the incident light of the microstructure unit. As shown in FIG. 9a, the incident light V can be expressed as ($V_x$, $V_y$, $V_z$), where a Z-axis is perpendicular to the screen, while an X-axis, a Y-axis are parallel to the screen. Obviously, the total internal reflection area of the incident light depends on value ranges of $V_x$ and $V_y$. $V_z$ satisfies:

$$V_z = \sqrt{1-V_x^2-V_y^2} \quad (5)$$

It is assumed that the emitted light is directed towards the viewer's eyes and the refractive index $n_1$ of the microstructure layer 121 is 1.6, and a variation trend of the value range of components ($V_x$, $V_y$) of the incident light, which satisfies the total internal reflection condition, with the refractive index $n_2$ of the inner layer 122 can be obtained according to the formulas (2) and (3). As shown in FIG. 9b, with the increase of $n_2$, the area for the incident light which satisfies that total internal reflection occurs on both of the two inclined surfaces of the microstructure unit continuously decreases. In other words, with the increase of $n_2$, a probability that the light emitted from the projector cannot be totally internally reflected twice on the two inclined surfaces of the microstructure unit increases. Therefore, in order to ensure a certain screen reflection efficiency, $n_1$ and $n_2$ need to be satisfied that:

$$n_2 < n_1 - 0.2 \quad (6)$$

It should be understood that in the case of satisfying the above conditions, the inner layer 122 may be an air layer. In this case, tips of the two inclined surfaces of the microstructure layer 121 are directly bonded to the light absorbing layer 11.

IV. Selection of Light Diffusing Layer

Figure 10:
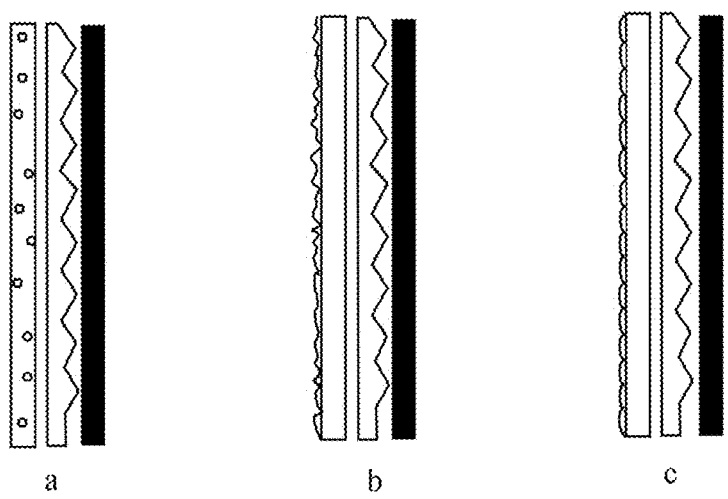
FIG. 10 is a schematic diagram of a scattering film layer of a total internal reflection screen according to the teachings of the present disclosure.

As described above, after the projection light is reflected by the total internal reflection layer 12, a divergence angle of the emitted light is generally very small, and in order to increase a visible range of the projection image, a light diffusing layer may be provided outside of the total internal reflection layer 12. In the example shown in FIG. 3, the volume diffusing layer 13 and the surface microstructure layer 14 are sequentially provided outside of the total internal reflection layer 12 as a light diffusing layer. However, it is possible that only one layer of the light diffusing layer is provided, or no light diffusing layer is provided. Three types of commercial optical scattering film structures that can be used as light diffusing layers are respectively shown in a to FIG. 10c: a volume scattering film, an irregular surface scattering film and a regular surface micro-lens array film. All these three kinds of scattering film materials can be used to increase the visible range of the screen, and they can be used individually or laminated as desired. For example, the volume diffusing layer 13 and the surface microstructure layer 14 in FIG. 3 may be formed by superposing the volume scattering film and the regular surface micro-lens array film. The number and kinds of laminating are not limited to this.

In the case where the optical scattering film is used as the light diffusing layer, the total internal reflection layer and the light diffusing layer are respectively prepared first and then bonded together by an optical bonding process. Alternatively, the light scattering layer and the total internal reflection layer may be respectively formed by processing two surfaces of the same substrate carrier (for example, PET).

V. Simulation Results of Performance of Total Internal Reflection Screen.

Figure 11:
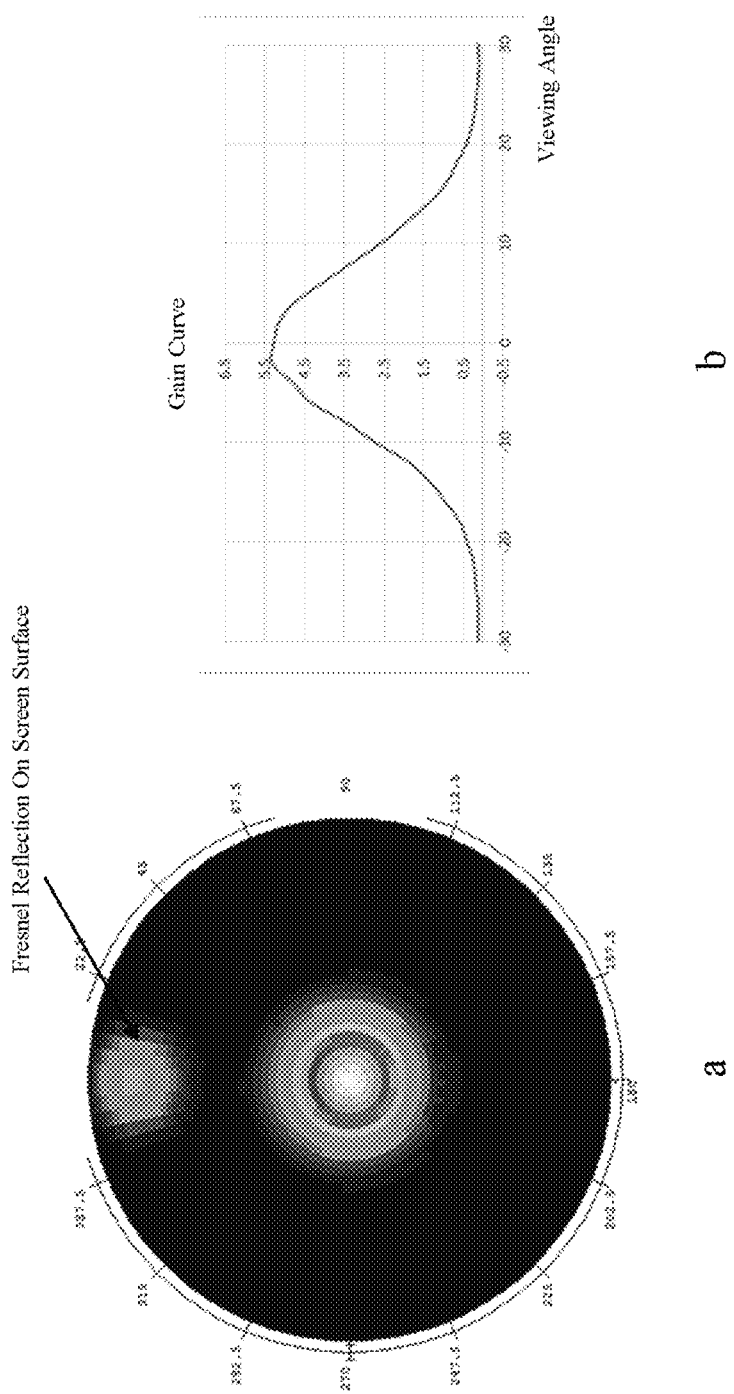
FIG. 11 shows simulation results of a scattering distribution and a screen gain of a total internal reflection screen according to the teachings of the present disclosure.
Figure 12:
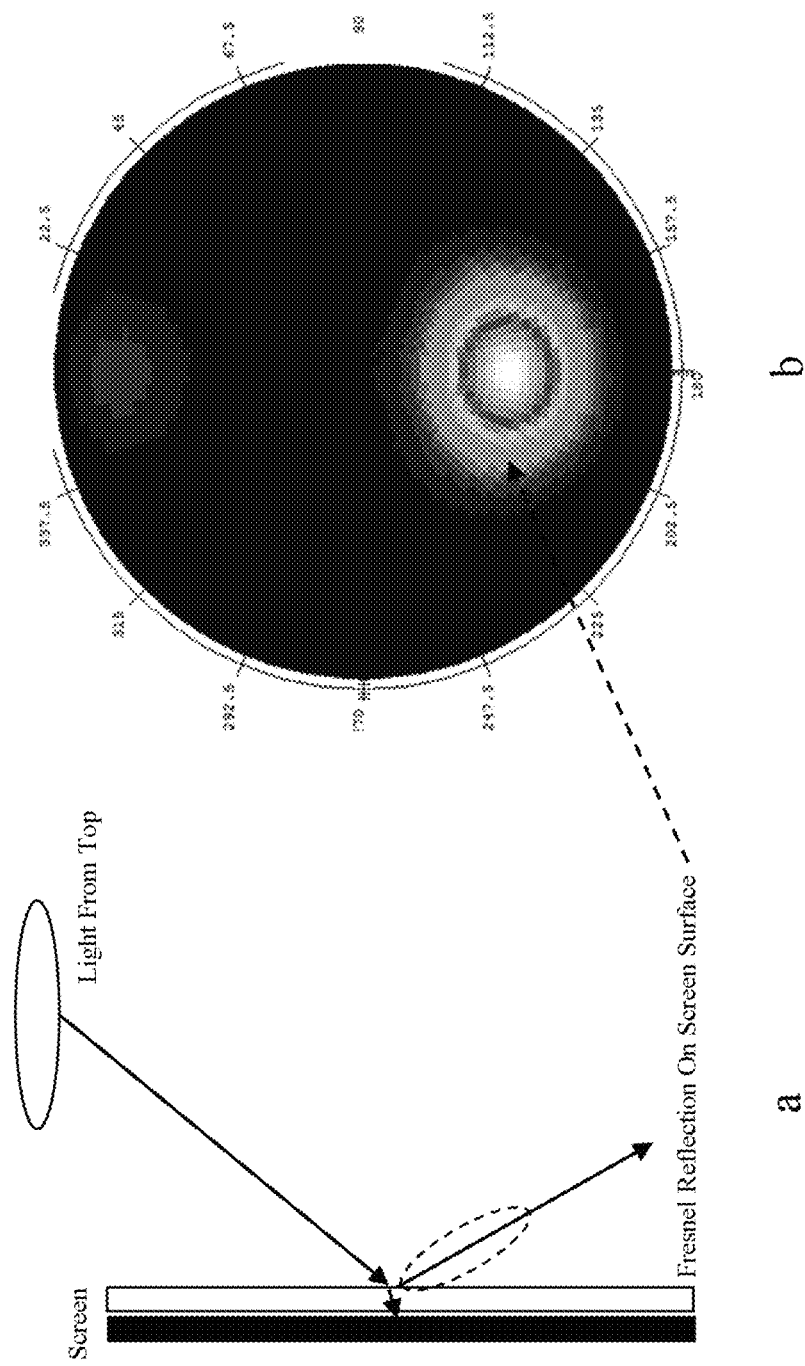
FIG. 12 shows simulation result of a scattering distribution of a total internal reflection screen according to the teachings of the present disclosure.
Figure 13:
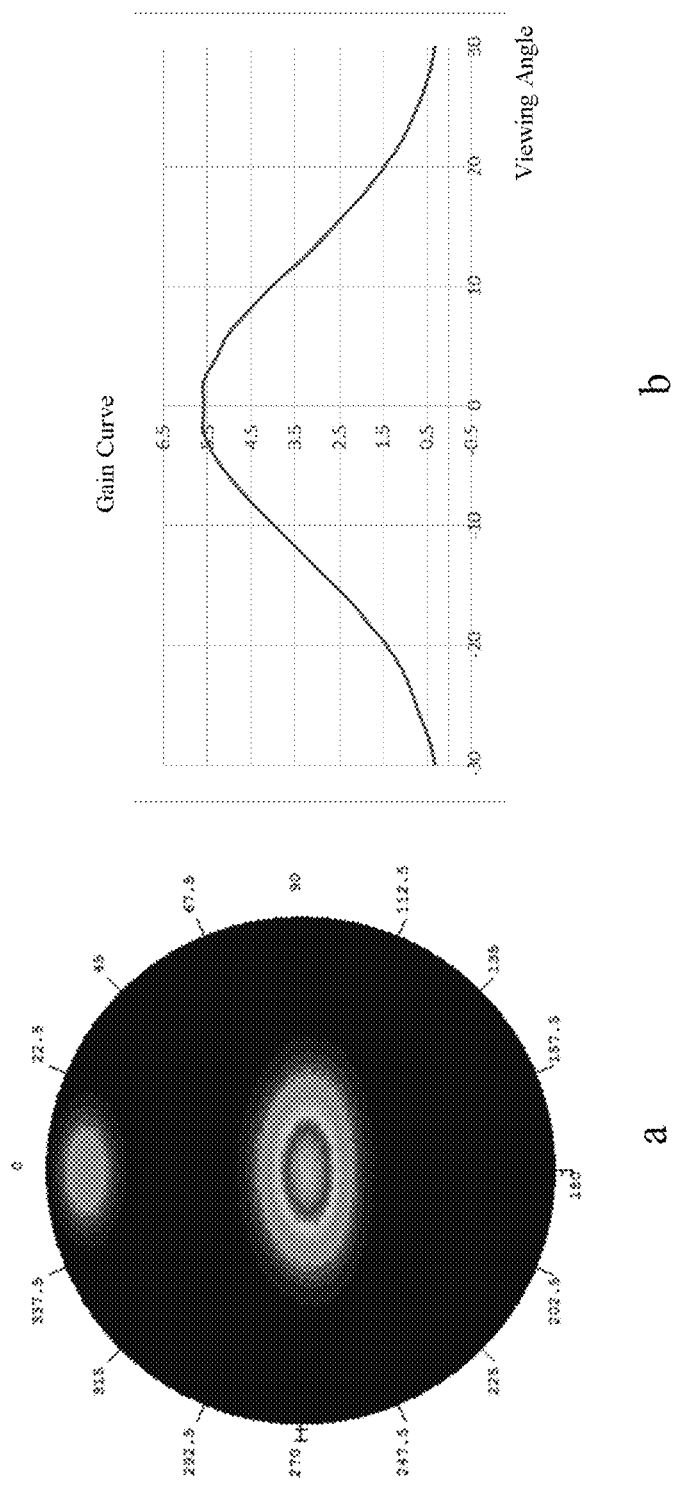
FIG. 13 shows simulation results of a scattering distribution and a screen gain of a total internal reflection screen according to the teachings of the present disclosure.

FIG. 11 to FIG. 13 respectively show simulation results of a scattering distribution and a screen gain of the total internal reflection screen according to one form of the present disclosure.

FIG. 11 illustrates simulation of the total internal reflection screen reflecting the light from the projector by in a case of using a 15-degree Gaussian scattering film as a light diffusing layer. The distribution of the projection light reflected by the screen in a total field of view is illustrated in FIG. 11a, and FIG. 11b illustrates the screen gain of the total internal reflection screen. It can be known from FIG. 11a that most of the light from the projector is concentrated in a circular effective field of view area near the center of the screen; a small part of the light is reflected to the direction of the ceiling by Fresnel reflection on the screen surface. As can be seen from FIG. 11b, at a gain angle of 20 degrees, a peak gain of 5.5 can be achieved. FIG. 12 illustrates simulation of the total internal reflection screen reflecting the ambient light in the case where the 15-degree Gaussian scattering thin film is used as the light diffusing layer. The simulation results show that most of the ambient light is absorbed by the black light absorbing layer after penetrating through the total internal reflection layer, and only a small part of the ambient light is reflected to the direction of the ground by the Fresnel reflection on the screen surface. Therefore, only a very small part of the ambient light will enter an effective field of view of the viewer, so it will not affect the contrast of a projected image.

In an actual application scenario, a horizontal viewing angle at which the viewer views the screen is larger than a vertical viewing angle. Therefore, the use of a thin film having an elliptical Gaussian scattering distribution as the light diffusing layer can effectively increase a horizontal scattering distribution of the reflected light beam, thereby increasing utilization of the reflected light. The simulation results in FIG. 13 show that a screen using the thin film having the elliptical Gaussian scattering distribution can expand the horizontal viewing angle of the screen to 35-40 degrees, while the vertical viewing angle is in the range of 20 degrees, and the peak value of the gain can still be as high as 3-5 and above.

Figure 14:
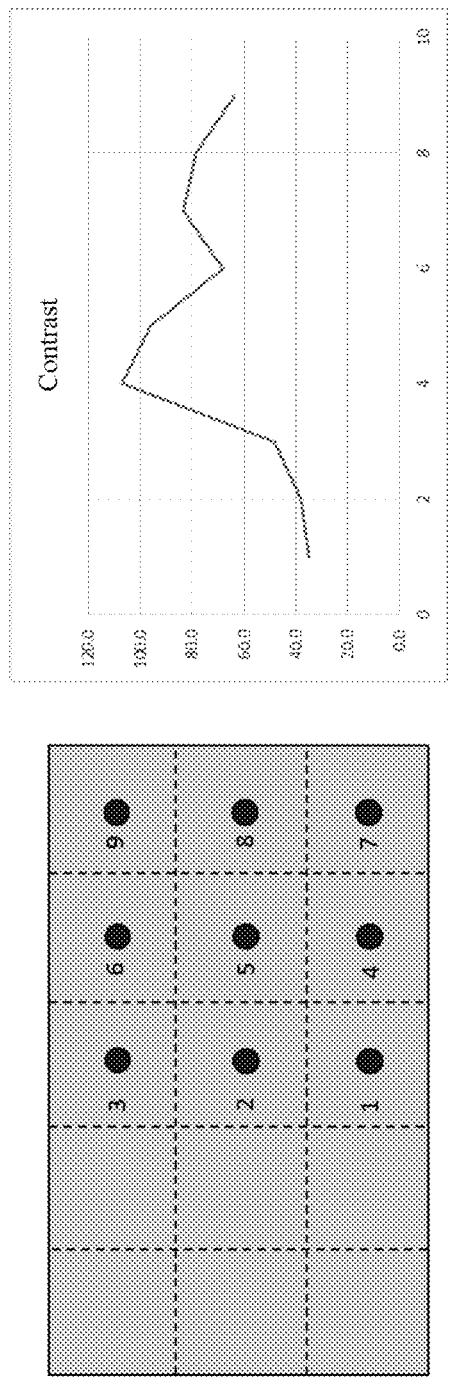
FIG. 14 shows simulation results of optical contrast of a total internal reflection screen according to the teachings of the present disclosure.

FIG. 14 shows simulation test results of contrast performed on the total internal reflection screen according to the present disclosure. As shown in FIG. 14a, the total internal reflection screen is divided into several regions, and contrast of 9 points are tested in a case where the projector located below the screen and a ceiling light of living room located above the screen having the same illuminance on the screen. As shown in FIG. 14b, the simulation results show that an average value of the contrast can be higher than 60, which is far beyond a level of the projection screen in the market. In practical application, the illuminance of the projection light of the projector on the screen will be larger than illuminance of the ambient light. Therefore, as the illuminance of the projection light increases, the contrast with respect to the ambient light will further increase, which can fully meet demands of home projection and commercial projection on contrast of projection images.

Although the total internal reflection screen according to the present disclosure has been described above with reference to the accompanying drawings, the present disclosure is not limited thereto, and those skilled in the art will understand that various changes, combinations, sub-combinations, and variations can be made without departing from the spirit or scope defined by the appended claims of the present disclosure. Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A total internal reflection screen for reflecting projection light from a projector into a field of view of a viewer, comprising a light diffusing layer, a total internal reflection layer, and a light absorbing layer that are arranged sequentially from an incident side for the projection light,
   wherein the light absorbing layer is configured to absorb incident light, and the light diffusing layer is configured to increase a divergence angle of emergent light,
   wherein the total internal reflection layer comprises at least a microstructure layer located on a side of the total internal reflection layer close to the light diffusing layer and an inner layer located on a side of the total internal reflection layer close to the light absorbing layer, wherein a refractive index of the microstructure layer is greater than that of the inner layer, and the microstructure layer is provided with a plurality of microstructure units thereon which extend continuously in a plane of the total internal reflection screen and are rotationally symmetrical, and wherein each of the microstructure units comprises two intersecting planes which are configured in such a manner that the projection light is totally internally reflected at both of the two intersecting planes successively, and
   wherein the microstructure layer of the plurality of microstructure units is provided as total internal reflection prisms which are rotationally symmetrical, and wherein angles between each of the two intersecting planes and the plane of the total internal reflection screen are $\theta_1$ and $\theta_2$ respectively, and $\theta_1$ and $\theta_2$ satisfy a relationship of $\theta_1+\theta_2<90$.

2. The total internal reflection screen according to claim 1, wherein the total reflection layer further comprises a transparent substrate layer, and wherein the plurality of microstructure units are cured on the transparent substrate layer by coating resin and then UV curing or thermoforming.

3. The total internal reflection screen according to claim 1, wherein the $\theta_1$ for each of the plurality of the microstructure units is different from each other, and the $\theta_2$ for each of the plurality of the microstructure units is equal to 45 degrees.

4. The total internal reflection screen according to claim 1, wherein the $\theta_1$ for each of the plurality of the microstructure units is different from each other, and the $\theta_2$ for each of the plurality of the microstructure units is different from each other.

5. The total internal reflection screen according to claim 1, wherein a refractive index $n_1$ of the microstructure layer and a refractive index $n_2$ of the inner layer satisfy a relationship of $n_2<n_1-0.2$.

6. The total internal reflection screen according to claim 1, wherein the light diffusing layer is formed of one of a volume scattering film, an irregular surface scattering film, and a regular surface micro-lens array film.

7. The total internal reflection screen according to claim 1, wherein the light diffusing layer is formed by laminating at least one of the volume scattering film, the irregular surface scattering film, and the regular surface micro-lens array film.

8. The total internal reflection screen according to claim 1, wherein the inner layer is an air layer.

9. The total internal reflection screen according to claim 1, wherein the two intersecting planes are configured in such a manner that the projection light travels, after being totally internally reflected for a first time, in a direction parallel to the plane of the total internal reflection screen.

10. The total internal reflection screen according to claim 1, wherein a rotation central axis of the plurality of the microstructure units that are rotationally symmetrical is perpendicular to the plane of the total internal reflection screen and located below the total internal reflection screen.

11. A projection system comprising a projector and a total internal reflection screen for reflecting projection light from the projector into a field of view of a viewer,
    wherein the total internal reflection screen comprises a light diffusing layer, a total internal reflection layer, and a light absorbing layer that are arranged sequentially from an incident side for the projection light,
    wherein the light absorbing layer is configured to absorb incident light, and the light diffusing layer is configured to increase a divergence angle of emergent light,
    wherein the total internal reflection layer comprises at least a microstructure layer located on a side of the total internal reflection layer close to the light diffusing layer and an inner layer located on a side of the total internal reflection layer close to the light absorbing layer, wherein a refractive index of the microstructure layer is greater than that of the inner layer, and the microstructure layer is provided with a plurality of microstructure units thereon which extend continuously in a plane of the total internal reflection screen and are rotationally symmetrical, and wherein each of the microstructure units comprises two intersecting planes which are configured in such a manner that the projection light is totally internally reflected at both of the two intersecting planes successively, and
    wherein a microstructure layer of the plurality of microstructure units is provided as total internal reflection prisms which are rotationally symmetrical, and wherein angles between each of the two intersecting planes and the plane of the total internal reflection screen are $\theta_1$ and $\theta_2$ respectively, and $\theta_1$ and $\theta_2$ satisfy a relationship of $\theta_1+\theta_2<90$.

12. The projection system according to claim 11, wherein the projector is an ultra-short focus projector located below the total internal reflection screen.

13. The projection system according to claim 11, wherein the total internal reflection layer further comprises a transparent substrate layer, and wherein the plurality of microstructure units are cured on the transparent substrate layer by coating resin and then UV curing or thermoforming.

14. The projection system according to claim 11, wherein the $\theta_1$ for each of the plurality of the microstructure units is different from each other, and the $\theta_2$ for each of the plurality of the microstructure units is equal to 45 degrees.

15. The projection system according to claim 11, wherein the $\theta_1$ for each of the plurality of the microstructure units is different from each other, and the $\theta_2$ for each of the plurality of the microstructure units is different from each other.

16. The projection system according to claim 11, wherein a refractive index $n_1$ of the microstructure layer and a refractive index $n_2$ of the inner layer satisfy a relationship of $n_2 < n_1 - 0.2$.

17. The projection system according to claim 11, wherein the two intersecting planes are configured in such a manner that the projection light travels, after being totally internally reflected for a first time, in a direction parallel to the plane of the total internal reflection screen.

18. The projection system according to claim 17, wherein the projector is arranged on a rotation central axis of the plurality of the microstructure units.

\* \* \* \* \*